Aug. 14, 1928.
M. J. BROWN ET AL
1,680,662
PROCESS FOR PRODUCING HYDROCYANIC ACID
Filed Oct. 19, 1925
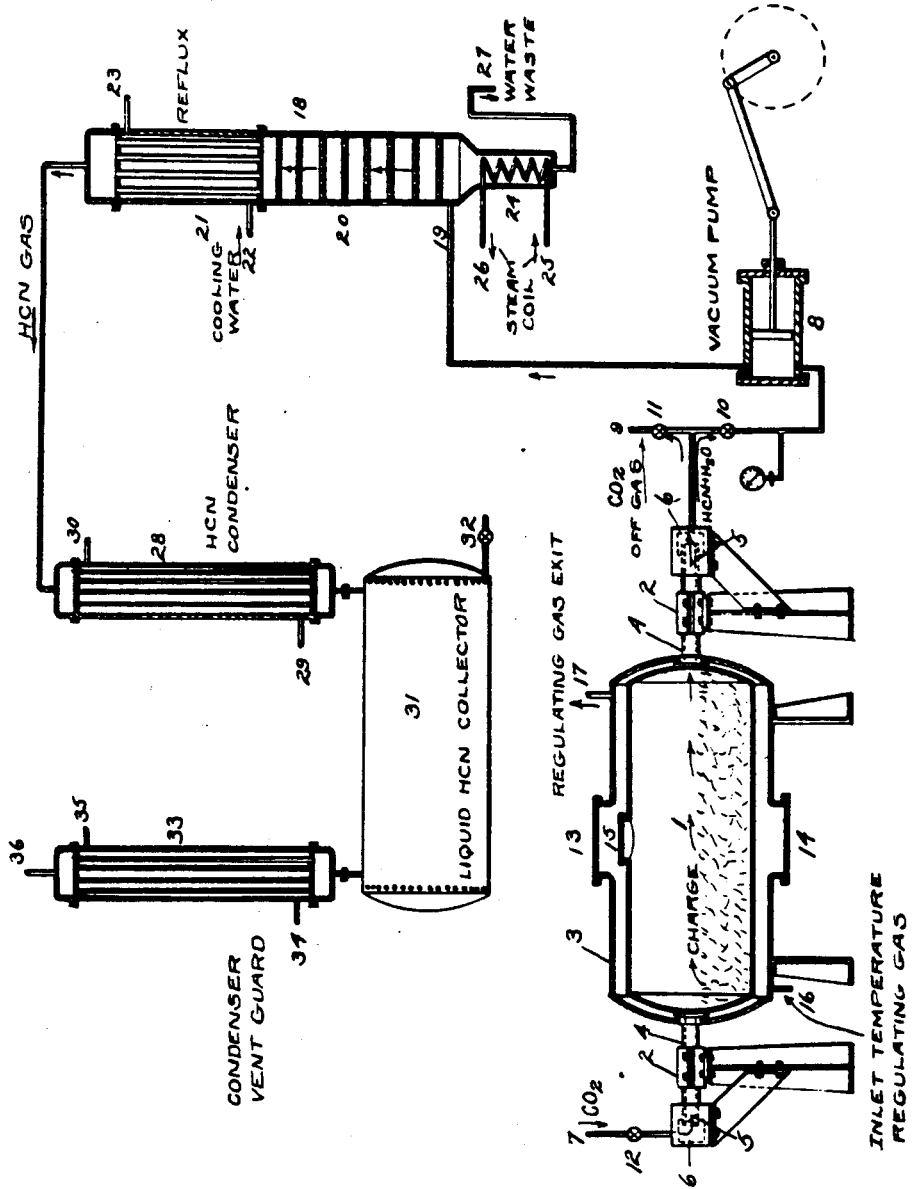
INVENTORS
BY
ATTORNEY Patented Aug. 14, 1928.

1,680,662

UNITED STATES PATENT OFFICE.

MORTIMER JAY BROWN, OF NIAGARA FALLS, AND EARLE ATHERTON HARDING, OF LA SALLE, NEW YORK, ASSIGNORS TO ROESSLER & HASSLACHER CHEMICAL COMPANY, OF NEW YORK, N. Y., A CORPORATION OF NEW YORK.

PROCESS FOR PRODUCING HYDROCYANIC ACID.

Application filed October 19, 1925. Serial No. 63,247.

Our invention pertains to the production of hydrocyanic acid; and it comprises a method of recovering HCN from materials of any degree of cyanide purity, and particularly from such cyanide materials as are heavily contaminated with carbonate, carbon and other impurities, by reacting the cyanide with any acid salt. The object of the invention is to cheapen the cost of recovery of hydrocyanic acid from such mixtures by decreasing the cost of raw materials, increasing the percentage yields, and increasing the capacity of the equipment used for the purpose.

Hydrocyanic acid is commonly made by reacting metal cyanides with acids such as sulphuric or with carbon dioxide in gaseous condition. The former method gives sodium sulphate as a by-product and requires a large excess of acid for the reaction particularly if large amounts of impurities, such as carbonates, are present. The latter method necessitates the use of fairly high grade carbon dioxide in considerable excess. Several difficulties are encountered in the employment of $CO_2$ gas for the direct liberation of HCN from cyanides. Very special methods are required to secure contact of $CO_2$ with all parts of the mass to be treated. Stirring and mixing devices are required and large excesses of $CO_2$ gas must be used. This last causes the resulting hydrocyanic acid gas to be much diluted with $CO_2$ which increases the difficulty of condensation and purification. Furthermore if flue gas is used additional very injurious impurities are brought into direct contact with the hydrocyanic acid.

Specifically, one of the objects of our invention is to incorporate into the solid mass containing cyanide, a definite quantity of solid or liquid reagent for the liberation of HCN. At the same time we desire to retain the advantages of a cyclical process by forming metal carbonate as the final solid reaction product, and also to recover the hydrocyanic acid gas sufficiently pure to be easily liquefied. The reaction between sodium cyanide and sodium bicarbonate has been proposed for this purpose but it has been pronounced ineffective due to the rapid polymerization of hydrocyanic acid in the alkali mass. We have discovered that when the proper conditions are maintained a very efficient recovery of hydrocyanic acid may be had by reacting sodium bicarbonate with low grade cyanide. We shall now explain our discovery.

When an acid salt is finely ground and dehydrated and is mixed with finely ground cyanide of any percentage purity, no reaction follows. When water is added, however, both the cyanide and the acid salt dissolve to an extent and the reaction follows to produce hydrocyanic acid and a non-acid salt. Some of the hydrocyanic acid escapes but most of it remains in the mass. This mass consists principally of water saturated with acid and non-acid salts. Specifically, when the acid salt is sodium bicarbonate and the non-acid salt is sodium carbonate, then the liquid is saturated with these two salts. If this mass is heated the reaction between sodium cyanide and sodium bicarbonate is accelerated, but most of the hydrocyanic acid is changed to a solid polymer and does not escape, so that the recovery of gaseous hydrocyanic acid may be not more than 10 to 20% of theory. When the reaction takes place in moist solids containing sodium bicarbonate, sodium carbonate and sodium cyanide, the particles of low grade cyanide are penetrated very slowly by the solution of sodium bicarbonate. We have found, for example, that if these mixtures are allowed to stand at ordinary temperatures and pressures for several hours, there will be unreacted sodium cyanide in the mass although there is at all times an excess of water and sodium bicarbonate, and therefore an excess of sodium bicarbonate solution. If heating is used to accelerate the reaction, polymerization proceeds almost as fast as the reaction and a high yield cannot be obtained. We have discovered that it is possible to obtain a high recovery of unpolymerized hydrocyanic acid from cyanide containing materials by the following process:

We mix finely divided, dry cyanide containing material with finely divided dry sodium bicarbonate. As long as these materials are kept dry there is no reaction. These materials are then placed in an efficient mixing machine that can be closed and evacuated. Water is then added so that the mixture may be quite moist. Reaction begins immediately although it does not proceed far. The equipment is then further evacuated and vigorous mixing is started. The rate of removal of the hydrocyanic acid depends upon the rate of the reaction between sodium cyanide and sodium bicarbonate. This in turn depends upon the rate at which superficial coatings of precipitated sodium carbonate are removed from the surfaces of the fine particles of low grade cyanide.

Our process is particularly valuable when used in cyclic operations for forming cyanides such as that in which sodium cyanide is formed from sodium carbonate, carbon and nitrogen according to the equation:

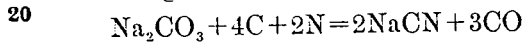

in which case we then treat the crude product of this reaction with sodium bicarbonate liberating hydrocyanic acid and reforming sodium carbonate according to the equation

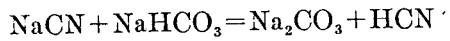

Following this, we return sodium carbonate from this second reaction to the process of the first reaction. In this cyclical process particularly high grade raw materials are not needed. In our process we take any sodium carbonate whether or not contaminated with carbon and other impurities and form a solution or slurry with water; sodium bicarbonate is then formed therein by treating with ordinary flue gas. The treatment of the sodium carbonate with $CO_2$ may be carried out under pressures above atmospheric in order to hasten the $CO_2$ absorption. The mixture so made constitutes our supply of sodium bicarbonate, and it can be introduced into our reaction vessel moist or wet. The presence of solid impurities such as carbon from flue gas or from other sources does not detract from its value as an acid reagent.

One of the particular advantages of our process over the use of carbon dioxide is that we incorporate our acid reagent, namely the sodium bicarbonate, throughout the mass of low grade cyanide. We therefore have released throughout the mass gaseous hydrocyanic acid that is uncontaminated by any other gas such as nitrogen or carbon dioxide. Any process involving the use of carbon dioxide for the recovery of hydrocyanic acid from cyanide materials requires that such materials be treated with a large excess of the gas. Whatever excess is used passes over with the hydrocyanic acid liberated and must be separated before a pure end product can be obtained. The recovery and purification of a high yield of unpolymerized hydrocyanic acid by our process is therefore commercially practicable. Inasmuch as the boiling point of hydrocyanic acid is only 26½° C. at atmospheric pressure it is removed easily under high vacuum at temperatures from 35-45° C.

We will now give one illustration of how our process may be used, although we wish it to be understood that it is only one example of many that can be cited. In the accompanying drawing 1 is a revolving cylinder of dimensions to take a large charge of our reacting mixture. It may be of any suitable metal such as iron, and may be of any suitable dimensions as, for example, 6 feet in diameter and 15 feet long. It is mounted in a horizontal position on bearings 2 and surrounded by a stationary shell 3 used for temperature regulation. Through a hollow shaft 4 there are openings 5 which may be connected through suitable fittings 6 to flue gas or any other carbon dioxide supply 7 and to vacuum pump 8. The line leading to the vacuum pump is provided with an extra opening 9 which by closing valve 10 and opening valves 11 and 12 permits the charge to be treated with flue gas to regenerate acid sodium carbonate in the reacting mass. The cylinder may be revolved by any convenient means and at any convenient speed. The outer shell 3 can be provided with openings 13 and 14 through which material can be charged into or discharged from the reacting cylinder through the manhole 15. All charging operations may be carried out through 13 when the opening 15 is in the up position and all discharging operations may be carried out through 14 when 15 is in the down position. A vessel of this nature, if of suitable dimensions and if revolved at suitable speed, will give very efficient mixing of the contents and the mixing will have what is very desirable, namely a grinding and abrading action on the individual particles.

In the operation of the process we can proceed as follows, which we give as only one illustration. The cylinder is filled a third full with a mixture of finely divided low grade cyanide and a mixture containing one and one-half times as much bicarbonate or acid salt as is necessary to completely liberate all the cyanide present, as hydrocyanic acid gas. Sufficient water is now added to bring the moisture content of the charge up to approximately 65% of the total weight. The cylinder is then closed, rotation started and a vacuum of 27 to 28 inches mercury applied. With this vacuum the temperature is held between the limits of 35° to 45° C. This is done by passing air at the required temperature into the shell 3, surrounding the reaction cylinder at 16 and allowing it to escape at 17. Both the temperature of the air entering the shell and the gas leaving the reaction cylinder can be measured by thermometers and adjusted accordingly. The hydrocyanic acid and water vapor is drawn off by the vacuum pump 8 and forced into the refluxing column 18 at the point 19. The final mixture of water and HCN passes upward through the bell section 20 of the tower to the condensing section 21 which is held at 30° C. by means of cooling water which enters at 22 and discharges at 23. The water carrying a portion of the HCN condenses and drains downward through the bell tower into the bottom compartment 24. This section of the tower is provided with a steam coil with the steam entering at 25 and discharging at 26. With the aid of the steam coil the temperature of the water is held at approximately the boiling point which removes the last traces of dissolved HCN and allows the waste water to drain away continuously to the sewer through the water overflow 27.

The HCN gas of approximately 97 to 99% purity passes from the top of the refluxing column 21 into the condenser 28 cooled by brine which enters at 29 and discharges at 30. The temperature of this condenser is held between the limits of −10 to −12° C. The liquid HCN collects in the receiver 31 and can be drawn off into containers through the valve 32. A second condenser 33 is mounted on the liquid HCN receiver and is cooled to approximately −20° C. by brine which enters at 34 and discharges at 35, and is vented to the air at 36. Since the freezing point of liquid HCN is −15° C. the amount of HCN which can escape will be the partial pressure of the solid product at the temperature of the condenser. The brine from condenser 33 can be used to cool condenser 28.

As soon as the reaction is finished the cylinder can be stopped with opening 15 in the down position, the covers of both openings 14 and 15 removed and a portion of the contents discharged and sent back to a proper furnace for regenerating cyanide in the mass. The remaining portion in the cylinder may either be transferred to other suitable equipment or the cylinder openings 14 and 15 may be closed and the cylinder revolved; by closing valve 10 and opening valves 11 and 12 gas is passed through the revolving mass for the formation of sodium bicarbonate. When the sodium bicarbonate is formed the cycle is repeated by adding the necessary amount of water and low grade cyanide to the bicarbonate mass and opening valve 10 and closing valves 11 and 12.

Briefly, we have discovered that hydrocyanic acid can be recovered with a high yield, above 90%, from cyanide bearing materials from any source and any degree of purity by reacting with acid salts if proper conditions are maintained. These conditions are:—

1. Temperatures should be maintained sufficiently low so that polymerization will not be rapid. The preferred temperature is around 35–45° C.

2. There should be enough water to form a solution around all the insoluble particles in addition to that required for the formation of water of crystallization of sodium carbonate at the temperature maintained.

3. Vigorous agitation and thorough mixing must be provided throughout the whole course of the reaction. This agitation and mixing must be such that layers of precipitated sodium carbonate will be abraded away from particles of low grade cyanide.

4. A sufficiently high vacuum must be maintained to cause boiling of the water at the temperatures used thereby forming a means of rapidly sweeping out the evolved HCN.

5. To get a satisfactory reaction between sodium bicarbonate and sodium cyanide we depend principally upon the mechanical agitation and upon the liberation of water vapor under low pressure at the temperature employed.

As a brief summary of the advantages of this process we wish to cite the following:

1. Yields of over 90% recovery of cyanide can be easily obtained from cyanide bearing material from any source and of any degree of purity.

2. Costs are low because:

(a) Very cheapest and most impure acid salts such as bicarbonates can be used. These may be regenerated from flue gases without removing soot or other impurities.

(b) The capacity of the apparatus can be increased in size until labor and supervision become a very small item of expense. This is due chiefly to the simplicity and inexpensiveness of the apparatus. This is made possible by the fact that it is not necessary to handle and separate from the HCN liberated large volumes of foreign gases such as carbon dioxide or nitrogen. Condensers or scrubbers can be of simple design because the gases obtained from this invention contain primarily HCN and water vapor which are easily separated.

(c) The bi-carbonate (or acid salt) can be from waste gases such as flue gases without further purification and definite amounts used depending on the concentration of the bicarbonate mixture desired.

3. The equipment is of simple construction and can be made up of any suitable metal such as iron.

4. Raw materials. Cyanide bearing materials from any source and of any degree of purity can be used. Bicarbonate made from flue gases or any other source can be used. Carbon for the primary HCN process and acid salts from the usual sources are suitable.

5. Liquid hydrocyanic acid of more than

99% purity can be obtained from this process.

Claims:

1. Process of producing hydrocyanic acid from cyanide containing material consisting in mixing the cyanide containing material with an acid salt and water, agitating the mixture, subjecting the mixture to a pressure sufficiently below atmospheric pressure to cause boiling of the water at a temperature below that at which the hydrocyanic acid would polymerize and allowing the vapors from the boiling water to sweep the evolved hydrocyanic acid from the reaction mass.

2. The process of producing hydrocyanic acid from cyanide containing material consisting in mixing the cyanide containing material with water and an acid salt at temperatures between 35° and 45° C. and at pressures sufficiently low to cause boiling of the water at the temperature used, agitating the mixture and removing the hydrocyanic acid at pressures less than atmospheric.

3. The method for recovering pure cyanogen compounds from materials containing them which consists in agitating the materials with water and sodium bicarbonate under less than atmospheric pressure and recovering the evolved cyanogen compounds.

4. Process of producing hydrocyanic acid from cyanide containing material consisting in mixing the cyanide containing material with sodium bicarbonate and water, agitating the mixture, subjecting the mixture to a pressure sufficiently below atmospheric pressure to cause boiling of the water at a temperature below that at which the hydrocyanic acid would polymerize and allowing the vapors from the boiling water to sweep the evolved hydrocyanic acid from the reaction mass.

5. The process of producing hydrocyanic acid from cyanide containing material comprising substantially metallic cyanides, metallic carbonates and carbon, mixing the cyanide containing material with water and sodium bicarbonate at temperatures between 35° and 45° C. and at pressures sufficiently low to cause boiling of the water at the temperature used, agitating the mixture and removing the hydrocyanic acid at pressures less than atmospheric.

6. A method of producing hydrocyanic acid which comprises subjecting a solid cyanide containing material to the action of sodium bicarbonate and water, agitating the mixture and regulating the temperature of the mass in the reaction zone to prevent polymerization of the hydrocyanic acid.

7. A method of producing hydrocyanic acid which comprises subjecting a solid cyanide containing material to the action of sodium bicarbonate and water, agitating the mixture and regulating the temperature and pressure in the reaction zone so as to rapidly remove evolved hydrocyanic acid and prevent polymerization of the HCN.

8. The process of producing hydrocyanic acid from cyanide containing material composed substantially of metallic cyanides, metallic carbonates and carbon, consisting in agitating the finely ground cyanide containing material with water and sodium bicarbonate at temperatures between 35° and 45° C. at pressures sufficiently low to cause boiling of the water at the temperature used and removing the hydrocyanic acid under a high vacuum.

9. The process of producing hydrocyanic acid from cyanide mixtures containing substantially sodium cyanide, sodium carbonate and carbon, consisting in agitating the finely ground cyanide mixture with water and sodium bicarbonate at temperatures from 35° to 45° C. at pressures sufficiently low to cause boiling of the water at the temperature used and removing the hydrocyanic acid under a high vacuum.

10. The process of producing hydrocyanic acid from cyanide containing material comprising substantially sodium cyanide, sodium carbonate and carbon, consisting in agitating the finely ground cyanide containing material with water and sodium bicarbonate at temperatures below 45° C. at pressures sufficiently low to cause boiling of the water at the temperature used and removing the hydrocyanic acid under a high vacuum.

11. The process of producing hydrocyanic acid from cyanide containing material comprising substantially sodium cyanide, sodium carbonate and carbon, consisting in agitating the cyanide containing material with water and sodium bicarbonate, applying a high vaccum and removing the hydrocyanic acid evolved.

12. The process of producing hydrocyanic acid from cyanide bearing material from any source and of any degree of purity consisting in mixing the cyanide material with water and an acid salt, regulating the temperature and pressure in the reaction zone so as to rapidly remove evolved hydrocyanic acid gas and prevent polymerization of the hydrocyanic acid in the reaction mass during the process of evolution and recovering the hydrocyanic acid.

Signed at Niagara Falls, in the county of Niagara and State of New York, this 8th day of October A. D. 1925.

MORTIMER JAY BROWN.
EARLE ATHERTON HARDING.